United States Patent
Wu et al.

(10) Patent No.: US 9,843,651 B1
(45) Date of Patent: Dec. 12, 2017

(54) SYSTEMS AND METHODS OF LOCALIZING DISTRIBUTED SOFTWARE APPLICATIONS

(71) Applicant: Dell Software Inc., Aliso Viejo, CA (US)

(72) Inventors: Guoxiong Wu, Zhuhai (CN); Mary Cindy Ah Kioon, Zhuhai (CN); Lijun Qian, Zhongshan (CN)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 14/976,652

(22) Filed: Dec. 21, 2015

(51) Int. Cl.
*G06F 9/44* (2006.01)
*H04L 29/08* (2006.01)
*G06F 9/445* (2006.01)

(52) U.S. Cl.
CPC .............. *H04L 67/34* (2013.01); *G06F 8/65* (2013.01); *H04L 67/10* (2013.01)

(58) Field of Classification Search
CPC .................................. H04L 67/34; G06F 8/65
USPC .................... 717/168–177; 709/203
See application file for complete search history.

(56) References Cited

U.S. PATENT DOCUMENTS

| | | | | |
|---|---|---|---|---|
| 5,596,702 | A | 1/1997 | Stucka et al. | |
| 6,367,077 | B1 * | 4/2002 | Brodersen ................ | G06F 8/65 707/E17.032 |
| 6,789,255 | B1 * | 9/2004 | Pedrizetti .................. | G06F 8/65 717/169 |
| 7,073,172 | B2 * | 7/2006 | Chamberlain ............ | G06F 8/61 717/169 |
| 7,150,014 | B2 * | 12/2006 | Graupner .................. | G06F 8/71 717/168 |
| 7,340,737 | B2 * | 3/2008 | Ghercioiu ................ | G06F 8/60 709/216 |
| 7,373,643 | B2 * | 5/2008 | Radatti ............... | G06F 17/3033 707/E17.005 |
| 7,496,910 | B2 * | 2/2009 | Voskuil ................... | G06F 8/65 717/168 |
| 7,568,018 | B1 * | 7/2009 | Hove .................... | H04L 41/085 707/999.202 |
| 7,890,543 | B2 * | 2/2011 | Hunt ..................... | G06F 9/4433 707/803 |
| 7,913,235 | B2 * | 3/2011 | Rose .................... | G06F 17/2705 704/277 |
| 7,971,202 | B2 * | 6/2011 | Bell ........................ | G06F 8/61 717/168 |

(Continued)

OTHER PUBLICATIONS

Cooper, "Charting a Course for Software Licensing and Distribution", ACM, pp. 153-156, 2010.*

(Continued)

*Primary Examiner* — Anil Khatri
(74) *Attorney, Agent, or Firm* — Winstead PC

(57) ABSTRACT

In one embodiment, a method includes, responsive to a trigger, automatically discovering localization value sets that are maintained at a plurality of application servers which execute a particular software application such that each localization value set comprises language-specific key-value pairs for user-interface display items of the particular software application and such that the discovering yields an overall collection of localization value sets. The method further includes determining a localization value set of the overall collection that is not stored at the computer system. In addition, the method includes storing the determined localization value set at the computer system.

17 Claims, 6 Drawing Sheets

(56) References Cited

U.S. PATENT DOCUMENTS

| | | | | |
|---|---|---|---|---|
| 8,302,093 | B2* | 10/2012 | Berg | G06F 8/60 717/120 |
| 8,407,683 | B2* | 3/2013 | Cheng | G06F 8/62 717/168 |
| 8,522,206 | B2* | 8/2013 | Chan | G06F 17/2288 717/121 |
| 8,612,967 | B1* | 12/2013 | Delker | G06F 8/61 717/169 |
| 8,726,147 | B1 | 5/2014 | Beatty et al. | |
| 8,918,776 | B2* | 12/2014 | Fei | G06F 8/61 717/169 |
| 8,972,973 | B2* | 3/2015 | Cavalaris | G06F 8/665 713/100 |
| 9,009,693 | B2* | 4/2015 | St. John | G06F 9/44536 717/162 |
| 2004/0199392 | A1 | 10/2004 | Khatri et al. | |
| 2006/0041879 | A1 | 2/2006 | Bower et al. | |
| 2008/0288955 | A1 | 11/2008 | Brockway et al. | |
| 2009/0037830 | A1 | 2/2009 | Kulkarni et al. | |
| 2009/0276206 | A1 | 11/2009 | Fitzpatrick et al. | |
| 2010/0146378 | A1 | 6/2010 | Bank et al. | |
| 2011/0179073 | A1 | 7/2011 | Nilsson | |
| 2012/0291009 | A1 | 11/2012 | Khare et al. | |
| 2012/0324418 | A1 | 12/2012 | Fallon | |
| 2014/0201643 | A1 | 7/2014 | Brisebois et al. | |

OTHER PUBLICATIONS

Anzbock et al, "Software Configuration, Distribution, and Deployment of Web-Services", ACM, pp. 649-656, 2002.*

Xu et al, "A Speed-based Adaptive Dynamic Parallel Downloading Technique", ACM, pp. 63-69. 2005.*

Balzer et al, "Application Downloading", IEEE, pp. 450-459, 1981.*

Bodhuin et al, "A Search-Based Approach for Dynamically Re-packaging Downloadable Applications". ACM, pp. 1-15, 2007.*

Al-Jaroodi et al, "Dual Direction Big Data Download and Analysis" ACM, pp. 98-101, 2014.*

Liu et al, "On the Impact of Concurrent Downloads", ACM, pp. 1300-1305, 2001.*

U.S. Appl. No. 14/858,299, Qian et al.

The Microsoft Developer Network, "Machine Translation Services in SharePoint 2013", Jul. 16, 2012, 13 pages.

The Microsoft Developer Network, "Walkthrough: Localizing a Web Part", Dec. 2010, 16 pages.

geekswithblogs.net, "Sharep10nt, All About SharePoint 2010/2013", Dec. 14, 2010, 19 pages.

Bamboo Solutions; "Highlights of PM Central: SA12 How this Product Benefits your Business"; http://bamboo.docfactory.com/#!doc/Project_Management/PM_Central/topic:Highlights_of_PM_Central; Oct. 24, 2014; 1 page.

aarebrot.net; "Changing the Properties of an Existing Web Part using PowerShell"; http://aarebrot.net/blog/2010/09/changing-the-properties-of-an-existing-web-part-using-powershell/; Sep. 2, 2010; 3 pages.

Wikimedia Foundation, Inc.; "Microsoft SharePoint Designer"; https://en.wikipedia.org/wiki/Microsoft_Sharepoint_Designer; last modified on Aug. 14, 2015; 3 pages.

Lightningtools; "Lightning Conductor Web Part 2010: Manual 5.1"; last update Sep. 8, 2014; 110 pages.

* cited by examiner

SYSTEMS AND METHODS OF LOCALIZING DISTRIBUTED SOFTWARE APPLICATIONS

BACKGROUND

Technical Field

The present disclosure relates generally to application management and more particularly, but not by way of limitation, to systems and methods of application localization.

History of Related Art

Software applications are becoming increasingly accessible to users around the world. Thus, systems and web pages often need to support multiple languages for globalization/localization. For many software applications, a specific version of a software in a specific language must be downloaded. This can make it cumbersome to support multiple languages.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, responsive to a trigger, automatically discovering localization value sets that are maintained at a plurality of application servers which execute a particular software application such that each localization value set comprises language-specific key-value pairs for user-interface display items of the particular software application and such that the discovering yields an overall collection of localization value sets. The method further includes determining a localization value set of the overall collection that is not stored at the computer system. In addition, the method includes storing the determined localization value set at the computer system.

In one embodiment, an information handling system includes a processor. The processor is operable to implement a method. The method includes, responsive to a trigger, automatically discovering localization value sets that are maintained at a plurality of application servers which execute a particular software application such that each localization value set comprises language-specific key-value pairs for user-interface display items of the particular software application and such that the discovering yields an overall collection of localization value sets. The method further includes determining a localization value set of the overall collection that is not stored at the computer system. In addition, the method includes storing the determined localization value set at the computer system.

In one embodiment, a computer-program product includes a non-transitory computer-usable medium having computer-readable program code embodied therein. The computer-readable program code is adapted to be executed to implement a method. The method includes, responsive to a trigger, automatically discovering localization value sets that are maintained at a plurality of application servers which execute a particular software application such that each localization value set comprises language-specific key-value pairs for user-interface display items of the particular software application and such that the discovering yields an overall collection of localization value sets. The method further includes determining a localization value set of the overall collection that is not stored at the computer system. In addition, the method includes storing the determined localization value set at the computer system.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1A:
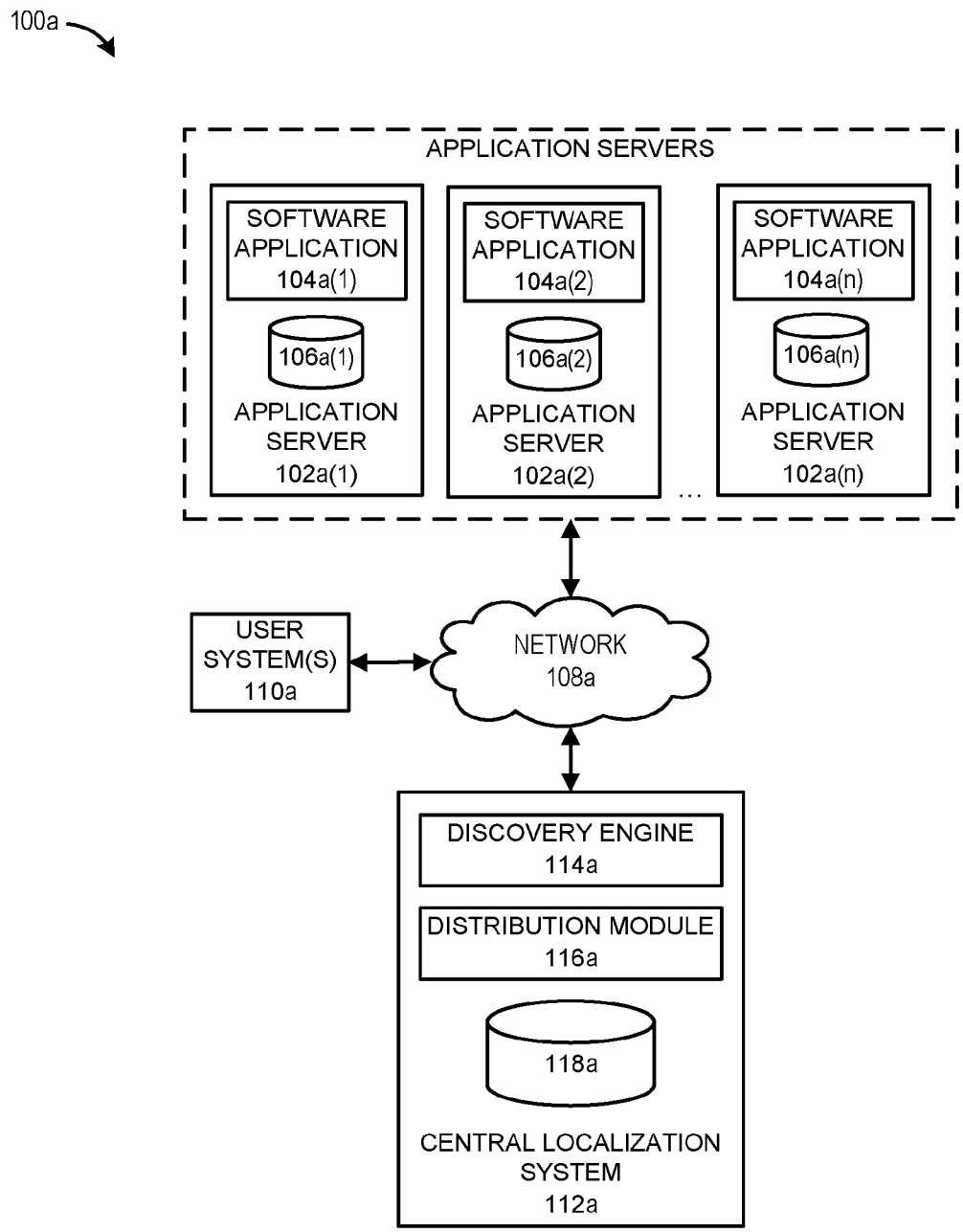
FIG. 1A illustrates an example of a computing environment.

In various embodiments, a system can include a plurality of application servers that each serve a software application to users around the world. Such a software application may be referred to herein as a distributed software application. The users may be located in different countries and speak different languages and, as a result, prefer that a user interface (UI) of the software application be provided in a particular language. For example, a user located in Germany may prefer a German UI, a user located in the United States may prefer an English UI, etc. As a general matter, however, users are not restricted in which of the application servers they access. Thus, each application server in the system may need to support multiple languages to support global access to the software application.

One way to address the above problem of multiple application servers and multiple languages might be to manually localize the software application on each application server for all supported languages. This process can be extremely time-consuming across tens, hundreds or even thousands of application servers. Further, if, for example, after initial configuration, the software application needs to support an additional language such as Chinese, manual configuration typically must be repeated across all application-server nodes in the system in order to add support for the additional language. As a practical matter, such manual configuration cannot repeatedly occur and thus application servers may become out of sync, with different application servers supporting different languages for the software application. This can result in users accessing the software application and not obtaining a UI in their language, despite the fact that there may be application server in the system which is configured to support their language.

The present disclosure describes examples of maintaining localization value sets at a plurality of application servers which execute a particular software application. In various cases, a localization value set can include language-specific key-value pairs for user-interface display items of the particular software application. A user-interface display item can correspond to a readable identifier such as text or a graphic that is presented to a user as part of a UI of the particular software application. For a given UI display item, the key-value pair can include a key that identifies the UI display item and a value such as, for example, a language-specific text string for the UI display item (e.g., English, French, Chinese, etc.). In certain embodiments, localization value sets can be automatically discovered, stored and/or distributed across the plurality of application servers which execute the particular software application.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1A illustrates an example of a computing environment 100a for localizing software applications. The computing environment 100a includes application servers 102a(1), 102a(2) and 102a(n) (collectively, application servers 102a), user system(s) 110a and a central localization system 112a that are each operable to communicate over a network 108a. The network 108a may be a private network, a public network, a local or wide area network, a portion of the Internet, combinations of the same, and/or the like.

In the illustrated embodiment, the application servers 102a(1), 102a(2) and 102a(n) execute software applications 104a(1), 104a(2) and 104a(n) (collectively, software applications 104a), respectively, and each maintain localization value sets 106a(1), 106a(2) and 106a(n) (collectively, localization value sets 106a), respectively. The software applications 104a can each correspond to executing instances of the same software application, which can be a distributed software application. Furthermore, the localization value sets 106a can each include language-specific key-value pairs for user-interface display items of the software applications 104a. In that way, each localization value set of the localization value sets 106a can include a same set of keys and different values (which can correspond to different languages). The localization value sets 106a(1), 106a(2) and 106a(n) can each include one, two, three or any other suitable number of localization value sets. Furthermore, the localization value sets 106a(1), 106a(2) and 106a(n) can each be representative of a data store, a plurality of data stores, one or more databases such as relational or non-relational databases, one or more flat files, combinations of the foregoing and/or the like.

The application servers 102a can be geographically separate or co-located. In some cases, the application servers 102a can be implemented on information handling systems. The application servers 102a may, for instance, include devices in a data center or in a plurality of data centers. The application servers 102a can be, be implemented on or include virtual machines, servers, web servers, other computer hardware, combinations of same and/or the like.

The central localization system 112a can discover and/or manage the localization value sets 106a at the application servers 102a. The central localization system 112a can include a discovery engine 114a, a distribution module 116a and central localization value sets 118a. Each of these components can be implemented with hardware and/or software, including (optionally) virtual machines and containers. In an example, the central localization system 112a can be implemented as a single management server. In another example, the central localization system 112a can be implemented in a plurality of virtual or physical servers, which may or may not be geographically co-located. For example, the central localization system 112a and/or other aspects of the computing environment 100a may be hosted in a cloud-based hosting service such as the Azure™ service provided by Microsoft® or the EC2™ platform provided by Amazon®.

The discovery engine 114a can operate to automatically discover localization value sets 106a that are maintained at the application servers 102a and store results of the discovery in the central localization value sets 118a. The central localization value sets 118a can be representative of a data store, a plurality of data stores, one or more databases such as relational or non-relational databases, one or more flat files, combinations of the foregoing and/or the like. In some embodiments, the distribution module 116a can operate to distribute localization value sets to the application servers 102a. Example operation of the discovery engine 114a and the distribution module 116a will be described in greater detail with respect to FIGS. 3-5.

The user system(s) 110a can be a computer system usable by an administrator, super user or other user to access the central localization system 112a. The user system(s) 110a can be an information handling system such as a smartphone, a wearable or body-borne computer, a desktop computer, a laptop computer, a tablet computer, a personal digital assistant (PDA), combinations of same and/or the like. In certain embodiments, the user system(s) 110a is an example of a computer system that can be used to administer the computing environment 100a. For example, in various embodiments, the user system(s) 110a can access a web interface, an application programming interface (API) or other interface of the central localization system 112a for purposes of triggering discovery or distribution of localization value sets. In certain embodiments, features of the components of the central localization system 112a can be made accessible over an interface to the user system(s) 110a.

Figure 1B:
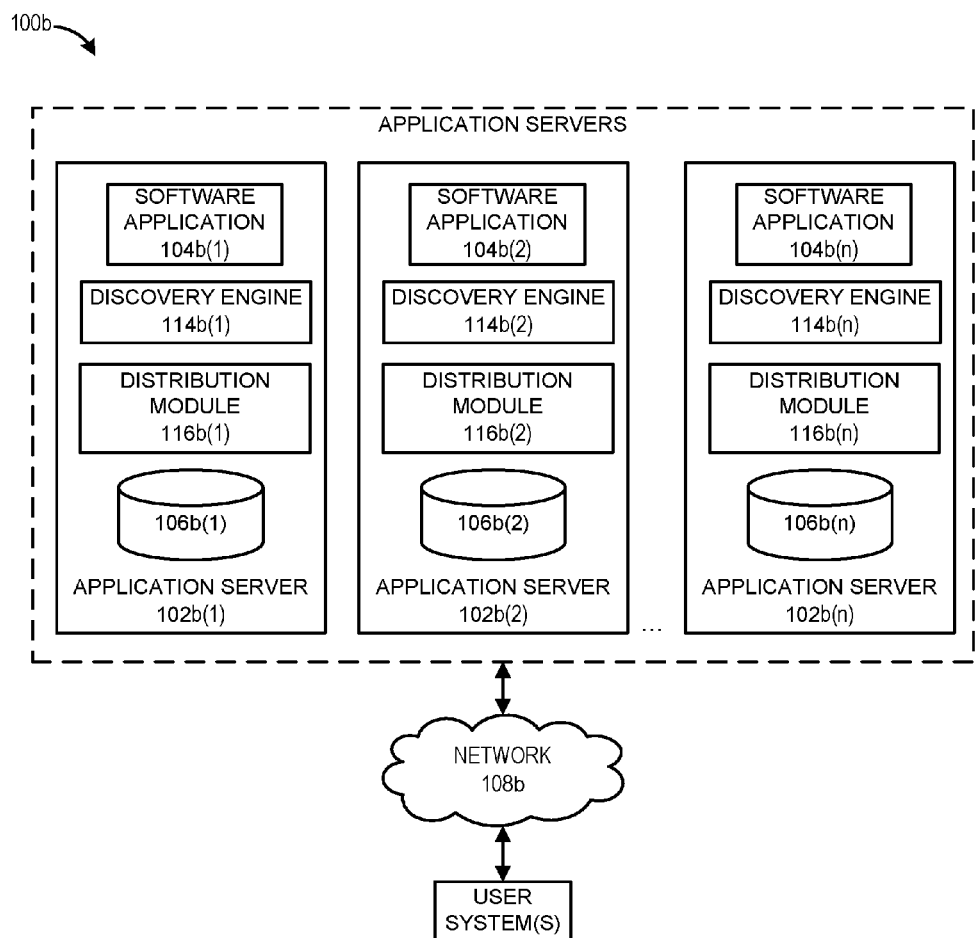
FIG. 1B illustrates an example of a computing environment.

FIG. 1B illustrates an example of a computing environment 100b for localizing software applications. The computing environment 100b includes application servers 102b(1), 102b(2) and 102b(n) (collectively, application servers 102b) and user system(s) 110b that are each operable to communicate over a network 108b. The network 108b may be a private network, a public network, a local or wide area network, a portion of the Internet, combinations of the same, and/or the like.

In general, the application servers 102b and the user system(s) 110b can function as described in relation to the application servers 102a and the user system(s) 110a of FIG. 1A. For example, the application servers 102b can each be, be implemented on or include virtual machines, servers, web servers, other computer hardware, combinations of same and/or the like. Different from the computing environment 100a of FIG. 1A, the computing environment 100b excludes a central localization system such as the central localization system 112a. In the embodiment illustrated in FIG. 1B, the application servers 102b can operate in a peer-to-peer or federated manner to discover and/or share localization value sets contained in the localization value sets 106.

More particularly, in the illustrated embodiment, the application servers 102b(1), 102b(2) and 102b(n) execute software applications 104b(1), 104b(2) and 104b(n) (collectively, software applications 104b), respectively, and each maintain localization value sets 106b(1), 106b(2) and 106b(n) (collectively, localization value sets 106b), respectively. The software applications 104b and the localization value sets 106b can function as described in relation to the software applications 104a and the localization value sets 106a, respectively, of FIG. 1A.

In contrast to the application servers 102a of FIG. 1A, the application servers 102b(1), 102b(2) and 102b(n) are shown to include discovery engines 114b(1), 114b(2) and 114b(n) and distribution modules 116b(1), 116b(2) and 116b(n). In some cases, the discovery engines 114b and the distribution modules 116b can each be part of the respective software application of the software applications 104b. In other cases, the discovery engines 114b and/or the distribution modules 116 can exist separately from the software applications 104b.

The user system(s) 110b can be a computer system usable by an administrator, super user or other user to access the application servers 102b and/or particular components of the application servers 102b such as one of the discovery engines 114b or one of the distribution modules 116b. The user system(s) 110b can be an information handling system such as a smartphone, a wearable or body-borne computer, a desktop computer, a laptop computer, a tablet computer, a personal digital assistant (PDA), combinations of same and/or the like. In certain embodiments, the user system(s) 110b is an example of a computer system that can be used to administer the computing environment 100a. For example, in various embodiments, the user system(s) 110(b) can access a web interface, an application programming interface (API) or other interface of any of the application servers 102b for purposes of triggering discovery or distribution of localization value sets. In certain embodiments, features of the components of the application servers 102b can be made accessible over an interface to the user system(s) 110b.

In similar fashion to the discovery engine 114a of FIG. 1A, the discovery engines 114b can each discover and store localization value sets. For example, the discovery engine 114b(1) can determine localization value sets stored within the localization value sets 106b(2) and 106b(n) and store any missing localization value sets within the localization value sets 106b(1). The discovery engines 114b(2) and 114b(n) can operate similarly. In some cases, the discovery engines 114b and the distribution modules 116b can function in a similar fashion to the central localization system 112a of FIG. 1. In these cases, the discovery engines 114b and the distribution modules 116 can determine missing localization value sets for each of the application servers 102b and, in some implementations, distribute the missing localization value sets. For example, the discovery engine 114b(1) of the application server 102b(1) could determine localization sets of the localization value sets 106b (across all the application servers 102b) that are not contained within the localization value sets 106b(2) of the application server 102b(2). A similar determination can be made in relation to the localization value sets 106b(n) of the application server 102b(n). In such cases, the distribution modules 116 can be operable to distribute the missing localization value sets. Further examples will be described in relation to FIGS. 3-5.

Figure 2:
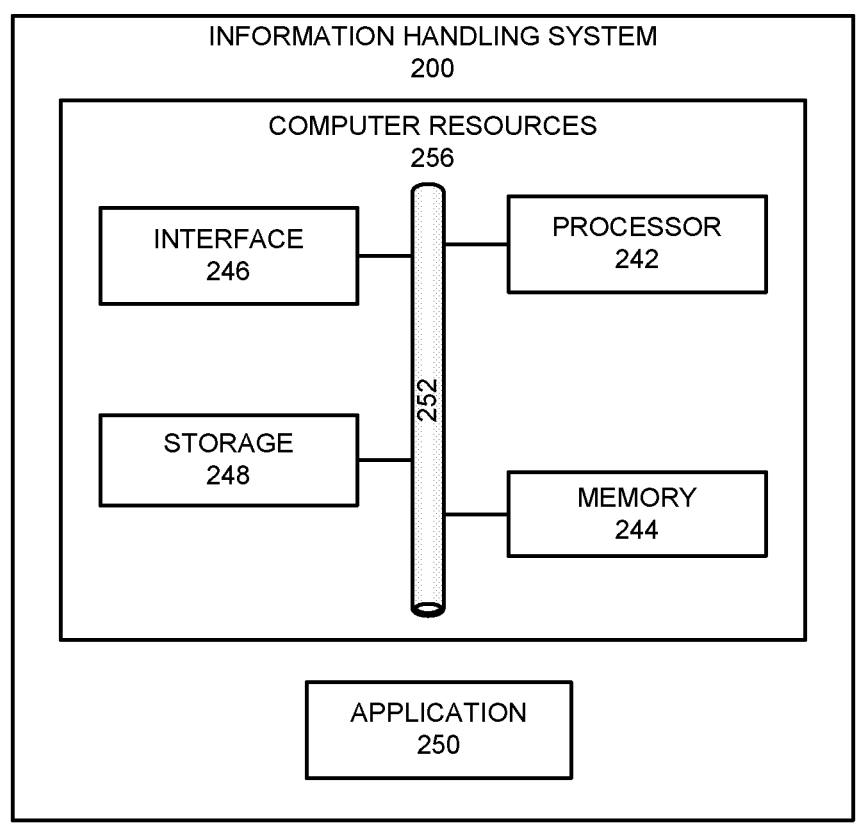
FIG. 2 illustrates an example of an information handling system.

FIG. 2 illustrates an example of an information handling system 200 that, in some cases, can be representative, for example, of the application servers 102a, the user system(s) 110a, the central localization system 112a, the application servers 102b and/or the user system(s) 110b. The information handling system 200 includes an application 250 operable to execute on computer resources 256. The application 250 can be similar, for example, to the software applications 104a, the software applications 104b, the discovery engine 114a, the discovery engines 114b, the distribution module 116a and/or the distribution modules 116b. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
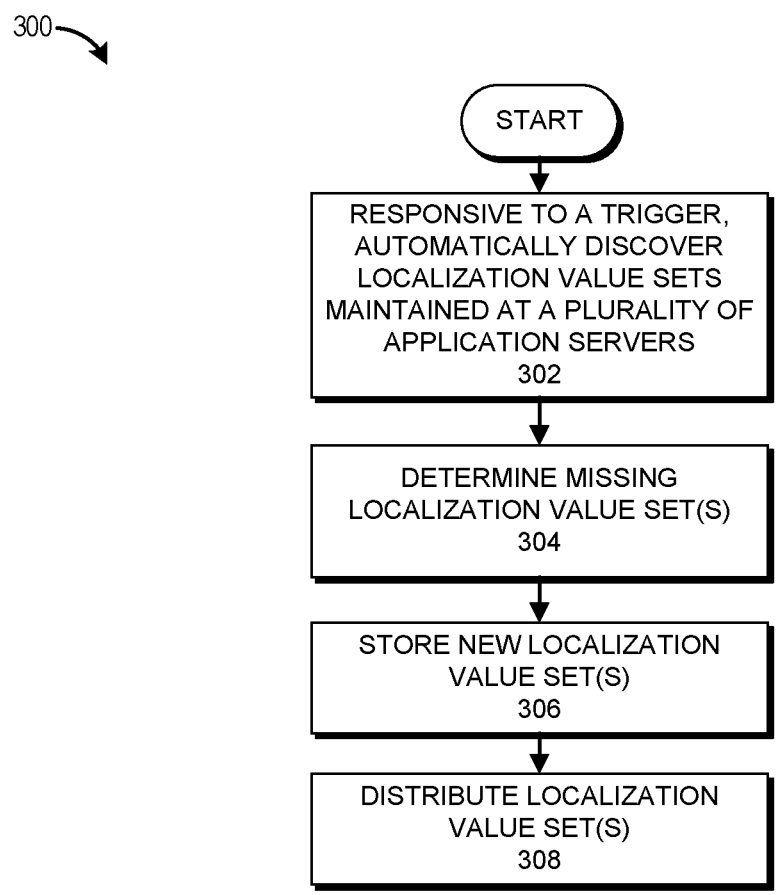
FIG. 3 illustrates an example of a process for automatically discovering localization value sets.

FIG. 3 illustrates an example of a process 300 for automatically discovering localization value sets. The process 300 can be implemented by any system that can process data. For example, the process 300, in whole or in part, can be implemented by one or more of the discovery engine 114a, any of the discovery engines 114b, the distribution module 116a, any of the distribution modules 116b, any of the application servers 102a and/or any of the application servers 102b. In some cases, the process 300 can be performed generally by the central localization 112a, the computing environment 100a or the computing environment 100b. Although any number of systems, in whole or in part, can implement the process 300, to simplify discussion, examples will periodically be described in relation to particular components of FIG. 1A or FIG. 1B.

At block 302, responsive to a trigger, a particular discovery engine such as, for example, the discovery engine 114a of FIG. 1A or one of the discovery engines 114b of FIG. 1B, automatically discovers localization value sets maintained at a plurality of application servers. The trigger for the block 302 can be received via one of the user system(s) 110a or 110b, for example. The trigger can also be a self-trigger, a scheduled trigger, combinations of the foregoing and/or the like. In general, the block 302 can include the particular discovery engine identifying an overall collection of localization value sets maintained across the plurality of application servers. In a typical embodiment, the overall collection of localization value sets includes unique localization value sets, such that each localization value set in the overall collection includes a unique set of key-value pairs.

In centralized implementations such as the embodiment illustrated in FIG. 1A, the block 302 can include the discovery engine 114a requesting localization value sets stored by each of the application servers 102a. In peer-to-peer implementations such as the embodiment illustrated in FIG. 1B, the block 302 can include one of the discovery engines 114b requesting localization value sets stored by one or more others of the application servers 102b. For example, in a peer-to-peer implementation, the discovery engine 114*b*(1) could request localization value sets stored by the application servers 102*b*(2) and 102*b*(*n*) in the localization value sets 106*b*(2) and 106*b*(*n*), respectively.

At block 304, the particular discover engine makes one or more determinations of missing localization value sets. For example, the block 304 can include identifying localization value sets of the overall collection yielded by block 302 that are not currently stored by the computer system on which the particular discovery engine is executing (i.e., missing localization value sets of the computer system). In addition, or alternatively, the block 304 can include determining localization value sets of the overall collection yielded by block 302 that are not currently stored by some or all of the application servers over which discovery was conducted (i.e., missing localization value sets of one or more those application servers). If a process such as the process 300 has not previously executed with respect to a given computer system or application server, the missing localization value sets may include the entirety of the overall collection.

By way of more specific example, in centralized implementations such as the embodiment illustrated in FIG. 1A, the block 304 could include the discovery engine 114*a* identifying localization value sets of the overall collection that are not stored within the central localization value sets 118*a* (i.e., missing localization value sets of the central localization system 112*a*). Still referring to centralized implementations, the block 304 could also include the discovery engine 114*a* identifying, for each application server of the application servers 102*a*, localization value sets of the overall collection that are not stored within the localization value sets 106*a* maintained at that application server (i.e., missing localization value sets of the application server).

By way of further example, in peer-to-peer implementations such as the embodiment illustrated in FIG. 1B, the block 304 can include one of the discover engines 114*b* determining localization value sets of the overall collection that are not stored on the respective application server of the application servers 102*b*. For example, the discovery engine 114*b*(1) could determine localization value sets of the overall collection that are not stored within the localization value sets 106*b*(1). In some implementations, the block 304 can additionally include making this determination for each other application server of the application servers 102*b*. For example, the discovery engine 114*b*(1) could also determine localization value sets of the overall collection that are not stored within each of the localization value sets 106*b*(2) of the application server 102*b*(2) and the localization value sets 106*b*(*n*) of the application server 102*b*(*n*). In these implementations, the functionality in peer-to-peer systems can attain a similar result to that of a centralized embodiment without the existence of a centralized localization system such as the central localization system 112*a* of FIG. 1A.

At block 306, the particular discovery engine stores any new localization value sets on the computer system. The new localization value sets can include the value sets that were determined at block 304 to not be stored at the computer system. In centralized implementations such as the embodiment of FIG. 1A, the discovery engine 114*a* can store the new localization value sets within the central localization value sets 118*a*. In peer-to-peer implementations such as the embodiment illustrated in relation to FIG. 1B, a discovery engine of the discovery engines 114*b* could store the new localization value sets on the respective application server of the application servers 102*b*. For example, the discovery engine 114*b*(1) could store the new localization value sets within the localization value sets 106*b*(1).

At block 308, a particular distribution module such as, for example, the distribution module 116*a* of FIG. 1A or one of the distribution modules 116*b* of FIG. 1B, can distribute individualized, missing localization value sets to the application servers over which discovery was conducted at block 302. As described above, block 304 can, in some implementations, include determining missing localization value sets of the application servers over which discovery was conducted at block 302. In these implementations, the missing localization value sets can be distributed to (e.g., caused to be stored by) the respective application servers for which those determinations were made. In some implementations, these determinations may be unnecessary or undesired. For example, with respect to FIG. 1B, in some peer-to-peer implementation, each of the application servers 102*b* may exclusively perform its own discovery and make its own determinations of missing localization value sets. In such implementations, the block 308 can be omitted.

Figure 4:
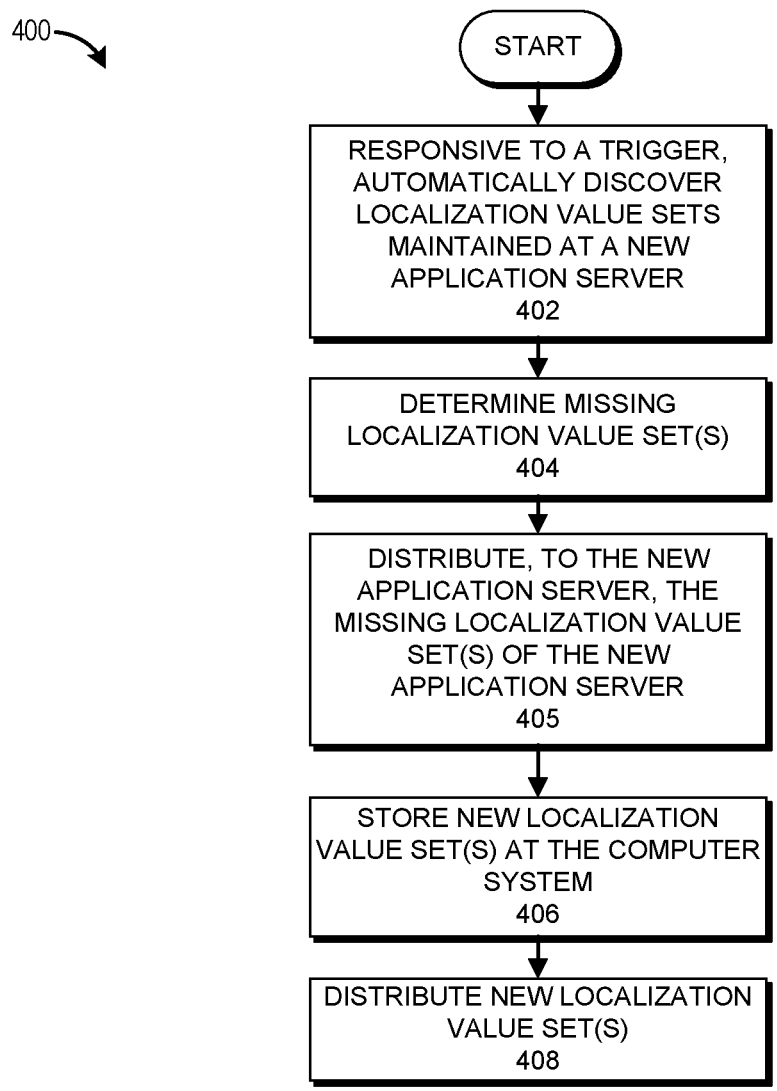
FIG. 4 illustrates an example of a process for automatically determining and providing localization value sets upon the addition of a new application server to a system.

FIG. 4 illustrates an example of a process 400 for automatically determining and providing localization value sets upon the addition of a new application server to a system. The process 400 can be implemented by any system that can process data. For example, the process 400, in whole or in part, can be implemented by one or more of the discovery engine 114*a*, any of the discovery engines 114*b*, the distribution module 116*a*, any of the distribution modules 116*b*, any of the application servers 102*a* and/or any of the application servers 102*b*. In some cases, the process 400 can be performed generally by the central localization 112*a*, the computing environment 100*a* or the computing environment 100*b*. Although any number of systems, in whole or in part, can implement the process 400, to simplify discussion, examples will periodically be described in relation to particular components of FIG. 1A or FIG. 1B.

At block 402, responsive to a trigger, a particular discovery engine such as, for example, the discovery engine 114*a* of FIG. 1A or one of the discovery engines 114*b* of FIG. 1B, automatically discovers localization value sets maintained at a new application server. In general, the block 402 can include the particular discovery engine identifying localization value sets maintained at the new application server in similar fashion to the description of block 302 of FIG. 3. The trigger for the block 402 can be received via one of the user system(s) 110*a* or 110*b*, for example. The trigger can be, for example, receipt of a notification of a new application server executing a particular software application (e.g., an addition to the application servers 102*a* of FIG. 1A or to the application servers 102*b* of FIG. 1B).

At block 404, the particular discover engine makes one or more determinations of missing localization value sets. For example, the block 404 can include identifying localization value sets of the new application server that are not currently stored by the computer system on which the particular discovery engine is executing (i.e., missing localization value sets of the computer system). In addition, or alternatively, the block 404 can include determining localization value sets stored on the computer system that are not currently stored on the new application server.

By way of more specific example, in centralized implementations such as the embodiment illustrated in FIG. 1A, the block 404 could include the discovery engine 114*a* identifying localization value sets of the new application server that are not stored within the central localization value sets 118*a* (i.e., missing localization value sets of the central localization system 112a). In addition, the block 404 could include the discovery engine 114a identifying localization value sets stored within the central localization value sets 118a that are not currently stored at the new application server (i.e., missing localization value sets of the new application server). By way of further example, in peer-to-peer implementations such as the embodiment illustrated in FIG. 1B, the block 404 can include one of the discovery engines 114b making the aforementioned determinations of missing localization value sets using its own storage of localization value sets as the basis for what is missing.

At block 405, a particular distribution module such as, for example, the distribution module 116a of FIG. 1A or one of the distribution modules 116b of FIG. 1B, can distribute, to the new application server, the missing localization value sets of the new application server. In a typical embodiment, the block 405 can include causing (e.g., instructing) storage of the missing localization value sets. At block 406, the particular discovery engine stores any new localization value sets on the computer system. The new localization value sets can include the value sets that were determined at block 404 to not be stored at the computer system.

At block 408, the particular distribution module can distribute the new localization value sets to the other application servers of the system. In some implementations, distribution may be unnecessary or undesired. For example, with respect to FIG. 1B, in some peer-to-peer implementation, each of the application servers 102b may exclusively perform its own discovery and make its own determinations of missing localization value sets. In such implementations, the block 408 can be omitted.

Figure 5:
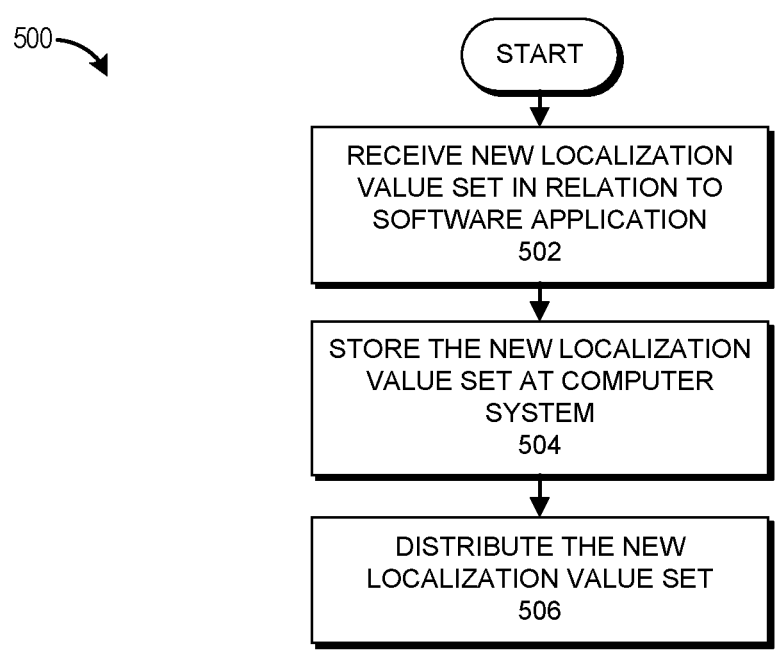
FIG. 5 illustrates an example of a process for automatically storing and distributing a new localization value set.

FIG. 5 illustrates an example of a process 500 for automatically storing and distributing a new localization value set. The process 500 can be implemented by any system that can process data. For example, the process 500, in whole or in part, can be implemented by one or more of the discovery engine 114a, any of the discovery engines 114b, the distribution module 116a, any of the distribution modules 116b, any of the application servers 102a and/or any of the application servers 102b. In some cases, the process 500 can be performed generally by the central localization 112a, the computing environment 100a or the computing environment 100b. Although any number of systems, in whole or in part, can implement the process 500, to simplify discussion, examples will periodically be described in relation to particular components of FIG. 1A or FIG. 1B.

At block 502, a particular discovery engine such as, for example, the discovery engine 114a of FIG. 1A or one of the discovery engines 114b of FIG. 1B, receives a new localization value set in relation to a particular software application. The new localization value set can be received from one of the user system(s) 110a or 110b, for example, or from another component in communication with the particular discovery engine. At block 504, the particular discovery engine stores the new localization value set at the computer system on which the particular discovery engine is executing. In general, the block 504 can include performing functionality similar to that which is described in relation to block 306 of FIG. 3 and block 406 of FIG. 4. At block 506, a particular distribution module such as, for example, the distribution module 116a of FIG. 1A or one of the distribution modules 116b of FIG. 1B, distributes the new localization value set to one or more application servers. In general, the block 506 can include performing functionality similar to that which is described in relation to block 308 of FIG. 3 and block 408 of FIG. 4.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
    responsive to a trigger, automatically discovering localization value sets that are maintained at a plurality of application servers which execute a particular software application, wherein each localization value set comprises language-specific key-value pairs for user-interface display items of the particular software application, wherein the discovering yields an overall collection of localization value sets;
    determining a localization value set of the overall collection that is not stored at the computer system;
    storing the determined localization value set at the computer system;
    automatically discovering localization value sets maintained at a new application server executing the particular software application;
    determining missing localization value sets of the new application server, wherein the missing localization value sets of the new application server comprise those localization value sets stored at the computer system which are not stored at the new application server;
    determining missing localization value sets of the computer system, wherein the missing localization value sets of the computer system comprise those localization value sets stored at the new application server which are not stored at the computer system;

distributing, to the new application server, the missing localization value sets of the new application server;

storing, at the computer system, the missing localization value sets of the computer system; and distributing, to the plurality of application servers, the missing localization value sets of the computer system.

2. The method of claim 1, comprising causing the plurality of application servers to each store the determined localization value set.

3. The method of claim 1, comprising causing the plurality of application servers to each store the overall collection of localization value sets.

4. The method of claim 1, wherein the automatically discovering localization value sets maintained at the new application server is triggered by receipt of a notification of the new application server.

5. The method of claim 1, comprising:

receiving a new localization value set in relation to the particular software application;

storing the new localization value set at the computer system; and distributing the new localization value set to the plurality of application servers.

6. The method of claim 1, wherein the computer system comprises an application server executing the particular software application.

7. An information handling system comprising a processor, wherein the processor is operable to implement a method comprising:

responsive to a trigger, automatically discovering localization value sets that are maintained at a plurality of application servers which execute a particular software application, wherein each localization value set comprises language-specific key-value pairs for user-interface display items of the particular software application, wherein the discovering yields an overall collection of localization value sets;

determining a localization value set of the overall collection that is not stored at the information handling system;

storing the determined localization value set at the information handling system;

automatically discovering localization value sets maintained at a new application server executing the particular software application;

determining missing localization value sets of the new application server, wherein the missing localization value sets of the new application server comprise those localization value sets stored at the information handling system which are not stored at the new application server;

determining missing localization value sets of the information handling system, wherein the missing localization value sets of the information handling system comprise those localization value sets stored at the new application server which are not stored at the information handling system;

distributing, to the new application server, the missing localization value sets of the new application server;

storing, at the information handling system, the missing localization value sets of the information handling system; and distributing, to the plurality of application servers, the missing localization value sets of the information handling system.

8. The information handling system of claim 7, the method comprising causing the plurality of application servers to each store the determined localization value set.

9. The information handling system of claim 7, the method comprising causing the plurality of application servers to each store the overall collection of localization value sets.

10. The information handling system of claim 7, wherein the automatically discovering localization value sets maintained at the new application server is triggered by receipt of a notification of the new application server.

11. The information handling system of claim 7, the method comprising:

receiving a new localization value set in relation to the particular software application;

storing the new localization value set at the information handling system; and distributing the new localization value set to the plurality of application servers.

12. The information handling system of claim 7, wherein the information handling system comprises an application server executing the particular software application.

13. A computer-program product comprising a non-transitory computer-usable medium having computer-readable program code embodied therein, the computer-readable program code adapted to be executed to implement a method comprising:

responsive to a trigger, automatically discovering localization value sets that are maintained at a plurality of application servers which execute a particular software application, wherein each localization value set comprises language-specific key-value pairs for user-interface display items of the particular software application, wherein the discovering yields an overall collection of localization value sets;

determining a localization value set of the overall collection that is not stored at an information handling system;

storing the determined localization value set at the information handling system;

automatically discovering localization value sets maintained at a new application server executing the particular software application;

determining missing localization value sets of the new application server, wherein the missing localization value sets of the new application server comprise those localization value sets stored at the information handling system which are not stored at the new application server;

determining missing localization value sets of the information handling system, wherein the missing localization value sets of the information handling system comprise those localization value sets stored at the new application server which are not stored at the information handling system;

distributing, to the new application server, the missing localization value sets of the new application server;

storing, at the information handling system, the missing localization value sets of the information handling system; and distributing, to the plurality of application servers, the missing localization value sets of the information handling system.

14. The computer-program product of claim 13, the method comprising causing the plurality of application servers to each store the determined localization value set.

15. The computer-program product of claim 13, the method comprising causing the plurality of application servers to each store the overall collection of localization value sets.

16. The computer-program product of claim 13, wherein the automatically discovering localization value sets maintained at the new application server is triggered by receipt of a notification of the new application server.

17. The computer-program product of claim 13, the method comprising:
- receiving a new localization value set in relation to the particular software application;
- storing the new localization value set at the information handling system; and
- distributing the new localization value set to the plurality of application servers.

* * * * *